(12) United States Patent
Papkov

(10) Patent No.: US 6,227,143 B1
(45) Date of Patent: May 8, 2001

(54) AUTOMATIC DRY PET FOOD DISPENSER

(76) Inventor: Evgeniy Zdravkov Papkov, 301, Dinison Place, Kitchener Ont. (CA), N2E 3A5

( * ) Notice: Subject to any disclaimer, the term of this patent is extended or adjusted under 35 U.S.C. 154(b) by 0 days.

(21) Appl. No.: 09/334,900

(22) Filed: Jun. 17, 1999

(30) Foreign Application Priority Data

Feb. 15, 1999 (GB) .................................................. 9903175

(51) Int. Cl.$^7$ .................................................. A01K 5/02
(52) U.S. Cl. .................................. 119/51.11; 119/51.12; 222/650
(58) Field of Search ............................ 119/51.11, 51.12, 119/51.13, 52.1; 222/650

(56) References Cited

U.S. PATENT DOCUMENTS

| | | | |
|---|---|---|---|
| 3,648,660 | * | 3/1972 | Esquival .............................. 119/51.11 |
| 3,741,162 | * | 6/1973 | Lopez ................................. 119/51.13 |
| 3,800,746 | * | 4/1974 | Stidham .............................. 119/56.1 |
| 3,900,007 | * | 8/1975 | Smith ................................. 119/51.13 |
| 4,279,221 | * | 7/1981 | Arvizu ............................... 119/51.11 |
| 4,722,300 | * | 2/1988 | Walker et al. ..................... 119/51.11 |
| 4,779,569 | * | 10/1988 | Lopez ................................. 119/51.11 |
| 5,003,920 | * | 4/1991 | Miksitz ............................... 119/163 |

* cited by examiner

Primary Examiner—Charles T. Jordan
Assistant Examiner—Yvonne R. Abbott

(57) ABSTRACT

An Automatic Dry Pet Food Dispenser releases measured quantities of dry pet food at pre-determined timed intervals over a several day period. The housing encloses a hopper, covered with a lockable lid. Underneath the hopper, a trough is pivotally mounted to the housing at its rear end. A front support of the trough is provided by a camshaft with several equally spaced cams, driven by a motor mechanism. The slope of the trough combined with its oscillating movement about the horizontal axis, caused by the rotating camshaft ensure the discharge of the material through the open front end of the trough into an external container. A timer controls the food quantity released at a single cycle and the schedule of operation.

4 Claims, 1 Drawing Sheet

AUTOMATIC DRY PET FOOD DISPENSER

BACKGROUND OF THE INVENTION

The present invention addresses a common problem of pet owners—leaving the animals at home unattended for a period from a couple of days to 1–2 weeks. Leaving a large amount of food is not a solution, since in most of the cases such food is consumed immediately. Arrangements with someone to look after the animals are not always possible. Boarding the pets is often an unjustified expensive alternative, bearing also the risk of the animal trying to escape from a foreign place.

Animal feeding apparatuses trying to solve the above-mentioned problem are described in a number of patents. For example, in U.S. Pat. No. 4,782,790 an endless belt conveys the food from a hopper to a container accessible to the animal.

In U.S. Pat. No. 3,949,909 a vibrator is mounted within a sleeve, suspended in a hopper. The vibrator has an extended portion through the sleeve's lower end, to which a food dispensing plate is attached.

In U.S. Pat. No. 4,756,277 three downwardly sloping platforms are located one over another in a zigzag manner. A vibration means is attached to the middle platform, ensuring the food transfer form the middle to the bottom platform. A vertical trap door is operated by a latching device, actuated synchronously with the vibration means.

Other teachings in the prior art are described in U.S. Pat. Nos. 3,542,251, 4,077,699, 4,182,273, 4,315,483, 4,497,280, 4,513,688, 4,688,520.

The apparatuses for automatic food dispensing, known so far, have the common disadvantage of incorporating many parts in complex mechanisms, thus reducing the reliability and making the commercial realization of such devices extremely difficult due to high production costs and specific conditions of use—from people of all levels of technical knowledge in private home environment.

BRIEF SUMMARY OF THE INVENTION

This invention refers to an Automatic Dry Pet Food Dispenser which, through vibratory action, excited by a controlled drive mechanism, feeds individual portions of dry pet food into an external container at specific timed intervals over a several day period. It offers a reliable and inexpensive alternative to other automatic food feeders.

The housing encloses a hopper, containing the food and covered with a lockable lid. The food is being discharged under gravity through an opening in the hopper's bottom onto a trough, pivotally mounted to the housing at the rear end of the trough. The distance between the hopper's bottom and the trough is adjustable in order to allow operation with different grain size food and at a different feed rate. A front support of the trough is provided by a camshaft with several equally spaced cams, rotated by a controlled drive mechanism. The slope of the trough combined with the oscillating movement about the horizontal axis, caused by the rotating camshaft ensure the discharge of the material through the open front end of the trough into an external container. The food quantity released at a single cycle of operation is controlled by a timer and is proportional to the duration and speed of running of the motor.

Additionally, the invention provides the necessary adjustment in order to use different kinds of dry food with different grain size, as well as to allow different quantities according to the pet needs to be supplied at a time.

BRIEF DESCRIPTION OF THE DRAWING

Attention is now directed to the attached drawing in which.

DETAILED DESCRIPTION OF THE INVENTION

Figure 1:
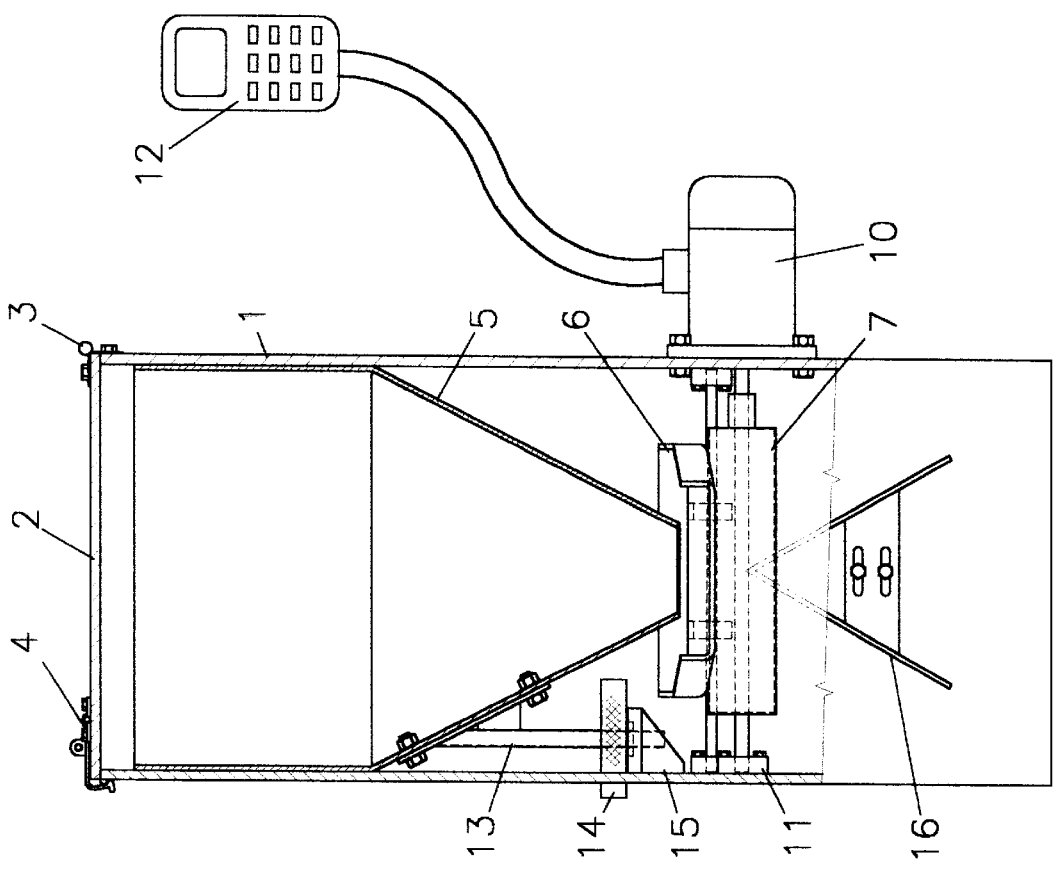
FIG. 1 is a front elevation with the front wall of the housing partially removed for clarity.

As shown in FIG. 1, the apparatus comprises a housing 1, having four walls and covered by a lid 2. The lid is attached to the housing by hinge(s) 3. A lock 4 prevents undesirable opening and access to the food by an intrusive animal.

Figure 2:
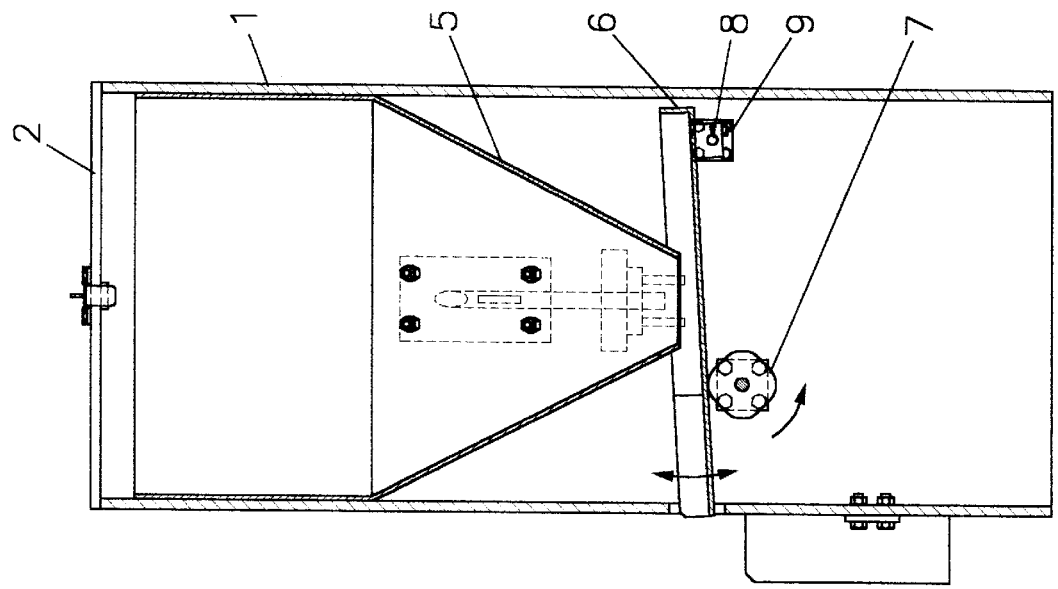
FIG. 2 is a longitudinal section through the device.

Referring now to FIG. 2, the housing 1 encloses a hopper 5 containing the dry pet food. The hopper 5 has a tapered bottom portion. A trough 6 is disposed underneath the hopper 5. The trough 6 has a bottom, side walls, back wall and an open front end, allowing free flow of the food through it. The trough 6 is clamped to an axle 8 in its rear end. The axle 8 is supported by two bearings, identified by the numeral 9. The bearings 9 are fixed to the housing 1 and allow the subassembly trough-axle to oscillate about a horizontal axis. The front end of the trough 6 is supported by a camshaft 7, having several cams along its trough supporting length.

Attention should next be directed back to FIG. 1, where the numeral 10 identifies an electromechanical drive mechanism, coupled to the camshaft 7. The latter is supported on the further side of the drive by a bearing 11. The drive is controlled by a timer 12, setting up the operation schedule of the drive. The speed of the drive may be variable to provide different discharge rates of the product.

The adjustment subassembly allows an adjustment of the gap between the hopper's discharge opening and the trough 6. As shown on FIG. 1, it consists of a threaded rod 13, a nut wheel 14 and a nut wheel support 15. The threaded rod 13 is fixed to the hopper 5 and supports it. By turning the nut wheel 14 the hopper 5 slides up and down within the housing 1.

A flow-splitting chute 16 is optional and may be used to divide the product flow in two.

What I claim as my invention is:

1. An apparatus for dispensing dry pet food in individual measured quantities at predetermined intervals over a several day period, comprising:
    a housing, enclosing a hopper with a discharge bottom opening,
    a trough, pivotally mounted at its rear end and underneath the hopper,
    the trough having second support by means of a camshaft, driven by a controlled electro-mechanical drive mechanism;
    a control timer means to actuate the drive mechanism at predetermined time(s) and for predetermined length(s) of time,
    the drive mechanism rotating the camshaft and thus exciting an oscillating movement of the trough about a horizontal axis,
    the oscillating movement combined with a slight slope of the trough ensuring the product discharge through the open front end of the trough.

2. An apparatus for dispensing dry pet food as claimed in claim 1, wherein the hopper location is adjustable in height, allowing variation of a gap between the hopper and the trough.

3. An apparatus for dispensing dry pet food as claimed in claim 1, wherein rotational speed of the camshaft is variable through the drive mechanism.

4. An apparatus for dispensing dry pet food as claimed in claim 1, wherein a flow-splitting chute is mounted to the housing underneath the discharge opening of the trough.

* * * * *